United States Patent Office 2,915,560
Patented Dec. 1, 1959

2,915,560

FORMALDEHYDE POLYMERS AND THE PROCESS OF PRODUCING SAME

David Steinhardt, Rochester, N.Y., and David X. Klein, Montclair, and Robert H. Barth, Ridgewood, N.J., assignors to Heyden Newport Chemical Corporation, New York, N.Y., a corporation of Delaware No Drawing. Application December 12, 1957
Serial No. 702,247

10 Claims. (Cl. 260—615.5)

The present invention relates to a novel process of producing formaldehyde polymers and also relates to the novel polymers obtained by this new process.

This application is a continuation-in-part of our abandoned application Serial No. 421,206, filed April 5, 1954.

For some uses of formaldehyde it is highly desirable to use a polymer having a low reactivity so that the formaldehyde will enter into the reaction very slowly or only upon heating to an elevated temperature. For example, a formaldehyde polymer of low reactivity is desirable for use in the preparation of resorcinol-formaldehyde resin adhesives. It also is quite desirable for some purposes that the formaldehyde polymer be free of sulfuric acid which interferes with the use of the polymers in certain reactions.

The present invention relates to linear hydrated polymers of formaldehyde which differ from previously described formaldehyde polymers in having lower reactivity than the other polymers, such as paraformaldehyde and the alpha and beta polyoxymethylenes. The new polymers contain less than 50 parts per million of sulfur and are free of sulfuric acid or other impurities which can materially affect the course of their reactions with other compounds. The new polymers are also characterized by an unusually low sublimation loss upon being heated at 150° F.

Paraformaldehyde, which is usually produced as a residue upon distillation of an aqueous formaldehyde solution, is a linear formaldehyde polymer of relatively low molecular weight melting at the relatively low temperature of 150° C. or lower. It is highly reactive, dissolves in water at a comparatively rapid rate, and usually contains about 4-5% of water. The alpha- and beta-polyoxymethylenes, which are also linear hydrated polymers of formaldehyde, are prepared by an acid precipitation method involving adding a relatively large amount of sulfuric acid to an aqueous solution of formaldehyde with cooling. After standing, the precipitated polymer is separated by filtration and dried. These polymers usually contain approximately 0.2–0.4% of sulfuric acid, which interferes with their use for some purposes. United States Patents No. 2,369,504 granted February 13, 1945, to Joseph F. Walker and No. 2,519,550 granted August 22, 1950, to Robert L. Craven disclose processes for preparing formaldehyde polymers. In these processes, an aqueous formaldehyde solution containing a small amount of non-volatile acid is evaporated to dryness at a temperature of 50-100° C. under vacuum. Walker's polymer melts at 160-170° C., and Craven's polymer melts at 165-183° C. While these polymers have a higher molecular weight, lower solubility and lower reactivity than paraformaldehyde, they are more soluble and more reactive than alpha- and beta-polyoxymethylenes.

In accordance with the present invention an aqueous formaldehyde solution is evaporated under partial vacuum in the presence of a small amount of sulfur dioxide to form a substantially dry, solid formaldehyde polymer which is then heated for an additional period to convert it to the present polymer. This polymer is characterized by a reactivity lower than that of alpha- and beta-polyoxymethylenes and by a melting range which is higher than those of the previously described linear polymers of formaldehyde. It is further characterized by a smaller loss of weight by sublimation on heating at 150° F. and by a lower water content than are shown by paraformaldehyde and the polyoxymethylenes.

In preparing this new linear polymer of formaldehyde we prefer to start with aqueous solutions containing at least 35% of formaldehyde. For commercial production we prefer to use solutions containing between 35% and 50% of formaldehyde. These formaldehyde solutions may be used as such or concentrated to 50% to 80% formaldehyde content before the sulfur dioxide is added. While the presence of methanol in the formaldehyde solution tends to lower the yield of the polymer, it does not have any effect on the characteristics of the product.

The amount of sulfur dioxide used may be within the range of 0.03–3.5% based on the weight of formaldehyde present. A larger amount of sulfur dioxide unduly lowers the yield, while the use of less sulfur dioxide results in a polymer having a standard reactivity higher than 2. The preferred amount of sulfur dioxide is in the range of 0.1–1.0%, which provides relatively higher yields of the polymer having a standard reactivity of 1 or less. These small quantities are the quantities present at the start of the cycle. They are sufficient for this purpose even though sulfur dioxide is volatile, and most of it is volatilized and passed off with the overhead vapors. The sulfur dioxide can be added either as a gas or as a solution in water or in formaldehyde.

The preparation of the new polymer involves a two step procedure. In the first step a formaldehyde solution is evaporated and polymerized to form a substantially dry, solid polymer. In the second step this polymer is converted to the new polymer of formaldehyde, which is distinguished principally by its low reactivity.

The second step may be carried out as a continuation of the first step without isolation of the intermediate polymer. Alternatively the heating can be interrupted after the completion of the first step, and the substantially dry polymer obtained can be converted to the new polymer at any convenient time merely by heating it under reduced pressure until a product having the desired characteristics is obtained.

The evaporation and polymerization step is carried out at a pressure less than atmospheric pressure. While any pressure less than atmospheric can be used, the yield is higher the lower the pressure. For example pressures in the range of 25–200 mm. of mercury absolute have been used in the commercial production of the new polymer, however, other pressures of less than one atmospheric may be used. The temperature used is dependent upon the pressure employed and need only be high enough to effect evaporation and removal of the water.

For example, temperatures between 40° C. and 80° C. may be used. The optimum conditions are approximately 100 mm. absolute pressure and 55-65° C.

The conditions under which the final conversion to the new polymer is carried out are not critical. In this step the substantially dry formaldehyde polymer is heated under reduced pressure until it is converted to the new polymer which has a "standard reactivity" of less than 2. For convenience this heating step is generally carried out at approximately the same pressure and temperature as was used in the evaporation and polymerization step. In this step as in the first step pressures ranging from 25-200 mm. absolute and temperatures between 40° C. and 80° C. can be employed. The time required to convert the first-formed polymer to the polymer which has low reactivity is dependent upon the temperature and pressure employed. When this step is carried out at 100 mm. absolute pressure and 55° C.-65° C., two to three hours is generally required for the formation of the new polymer. At higher temperatures less time is required. Completion of this second step can be determined by determining the standard reactivity of the product in the manner hereinafter described.

The expression "standard reactivity" as used herein indicates the percent of the formaldehyde polymer which dissolves or depolymerizes under certain conditions in water. It is generally recognized that a formaldehyde polymer depolymerizes when dissolved in water and that the determination of the solubility in water in a unit of time is a measure of the rate at which the polymer will react. The "standard reactivity" is expressed as the percent of the polymer dissolved so that the lower the value, the lower the reactivity. "Standard reactivity" is determined by agitating two grams of the polymer in 50 ml. of aqueous pH 7.8 buffer (Clark and Lubs standard phosphate buffer) at 25° C. for 40 minutes. The solution is then filtered and the formaldehyde content of the filtrate is determined by titration with sodium bisulfite. The weight of formaldehyde so determined is divided by the weight of the sample and multiplied by one hundred to obtain the percentage dissolved. A pH 7.8 buffer is used so that a measurable titration can be made over a wide variation of reactivities.

The "resorcinol reactivity" test is another known test for indicating the comparative reactivity of formaldehyde polymers. This test is described in United States Patent No. 2,519,550 issued August 22, 1950, to R. L. Craven. In this test, 15 grams of resorcinol is dissolved in 15 ml. of normal aqueous sodium hydroxide and the solution allowed to stand for one hour at 25° C. Then 25 ml. of this resorcinol solution is placed in a one inch by eight inch test tube in a Dewar flask, and thereafter 5 grams of the polymer under test is added to the test tube. A glass stirrer is used to keep the polymer in suspension, and the test tube is equipped with a thermometer. The time in minutes required for the mixture to reach 60° C. is the "resorcinol reactivity" of the polymer. The longer the time and the higher the value of "resorcinol reactivity," the lower the reactivity of the polymer; whereas, the lower the value of "standard reactivity," the lower the reactivity of the polymer. With the present polymer, the reactivity is so low that in the resorcinol test the temperature had not risen above 29° C. at the end of 150 minutes.

The following examples illustrate the present invention which is not limited to the particular conditions set forth except as expressly stated in this specification and claims:

*Example 1*

Four hundred and sixty pounds of aqueous formaldehyde solution which contained 39.9% by weight of formaldehyde and 4.5% of methanol was placed in a rotary vacuum dryer and concentrated at 100 mm. absolute pressure until a distillate weighing 149 pounds had been collected. Then a solution of 2 pounds of sulfur dioxide in 35 pounds of 39.9% formaldehyde was added to the 311 pounds of concentrated solution, and the concentration was continued at 100 mm. absolute pressure for 8.5 hours. Steam was used as a source of heat. During about the first 2½ hours the steam pressure was atmospheric. Then the steam pressure rose to 10 pounds per square inch (gage) and after 3½ hours the steam pressure was 12 pounds per square inch. During this time the temperature of the formaldehyde solution being evaporated rose from about 55° C. to about 60° C. At the end of this evaporation period, the product was a substantially dry, solid material and no more distillate was obtained. This material was then heated for 2 hours at 100 mm. absolute pressure and at about 60-65° C.

The product consisted of 86 pounds of a coarse, granular material which assayed 98.5% formaldehyde, had a "standard reactivity" of 0.47, and contained 0.08% water. Approximately 44% of all the formaldehyde charged was converted by this procedure to the new linear polymer.

*Example 2*

One gram of sulfur dioxide was added as a saturated aqueous solution to 500 grams of methanol-free formaldehyde solution containing 40% of formaldehyde. The mixture was evaporated to a substantially dry, solid polymer by heating it up to about 69° C. and 100 mm. mercury absolute pressure for 3.5 hours. This material was heated for an additional 1.5 hours at about 67° C. and 100 mm. absolute pressure to yield a polymeric material which had a "standard reactivity" of 1.4 and a formaldehyde content of 98.7%.

*Example 3*

To five hundred grams of a formaldehyde solution which contained approximately 41% of formaldehyde and 5.5% of methanol was added 10 cc. of a saturated aqueous solution of sulfur dioxide (this contained 1 gram of $SO_2$). This mixture was heated at about 56°-59° C. and 100 mm. absolute pressure for 3.3 hours. The product obtained was a substantially dry polymer of formaldehyde which had a "standard reactivity" of 3.83. Heating this material at about 59°-63° C. and 100 mm. absolute pressure for an additional 2 hours yielded a product which had a "standard reactivity" of 0.91.

*Example 4*

When 500 grams of a formaldehyde solution containing 40.22% of formaldehyde and 5.4% of methanol was evaporated substantially to dryness in 3 hours at 63° C. and 200 mm. absolute pressure in the presence of 0.5 gram of sulfur dioxide (as a saturated aqueous solution), a substantially dry, solid polymer was obtained which after heating for an additional 3 hours at about 63° C. and 200 mm. absolute pressure had a "standard reactivity" of 0.83.

*Example 5*

A sample of paraformaldehyde which had a "standard reactivity" of 46.2 was heated at 70° C. in a closed vessel under superatmospheric pressure in an atmosphere of sulfur dioxide for one hour. At the end of this time the paraformaldehyde had been converted to a formaldehyde polymer which had a formaldehyde content of 97.8% and a "standard reactivity" of 1.9.

The conversion of paraformaldehyde to the present polymer can be accomplished at atmospheric pressure or super atmospheric pressure. While heating is desirable to shorten the reaction time, conversion can be accomplished at room temperature in an atmosphere containing or consisting of gaseous $SO_2$. For faster results it is preferable that the surrounding atmosphere contain at least 50% gaseous $SO_2$ with the remainder being air or any other gaseous medium inert to the reactants.

In the foregoing Examples 2 through 5, the heating medium was an oil bath maintained at about 100° C. The temperatures to which the material was heated was measured by means of a thermometer which extended into the interior of the vessel and into contact with the contents. The recorded temperatures are fairly accurate and believed to be within 3° ± of the actual temperature, however, it will be understood that some variation from the recorded temperatures may have existed as result of poor contact between the thermometer and the solid material.

The properties of the present polymer are compared with those of previously described polymers of formaldehyde in the following table:

| | Paraformaldehyde | Walker's Polymer | Craven's Polymer | α-Polyoxymethylene | β-Polyoxymethylene | Present Polymer |
|---|---|---|---|---|---|---|
| Melting Range (° C) | 115–150 [1] | 160–170 [1] | 165–183 [2] | 170–175 | 165–170 | 187–190. |
| Standard Reactivity | 60–80 | | | | 4–5 | <2. |
| Resorcinol Reactivity | 3–6 [1] | 7–20 | >20 | 45–70 | ∞ | ∞. |
| Solubility in Water at 25° C | 6% in 4 Days | 0.5–1.5% | | 0.0–0.1% in 1 hour. | 0.07% in 4 days | 0.13% in 4 days. |
| Hot Glacial Acetic Acid | Completely dissolved in 3 min. | | | | 50% dissolved in 45 min. | 99% dissolved in 45 min. |
| Sublimation Loss at 150° F.: | | | | | | |
| In 1 day | 13.6% | | | | 23.2% | 7.8%. |
| In 3 days | 28.3% | | | | 49.3% | 16.7%. |

[1] Data from U.S. Patent No. 2,369,504 to Walker.
[2] Data from U.S. Patent No. 2,519,550 to Craven.

It is evident from the above table that the present linear polymer of formaldehyde has properties which are quite different from those of previously described polymers of this type. The present polymer has a higher melting range and lower reactivity than any of the other linear polymers of formaldehyde. It also has a lower sublimation loss and different solubility characteristics. The present polymer is also characterized by a formaldehyde content of 97–99%, a very low water content, and a sulfur content of less than 50 parts per million.

The present polymer is useful in combustible heat tablets. The polymer may be formed by compression into dense hard tablets which may be easily ignited with a match. Upon ignition, these tablets burn with a non-luminous flame which is not readily blown out and which does not give off a detectable odor of formaldehyde.

We claim:

1. A linear formaldehyde polymer having a standard reactivity of not more than 2, said standard reactivity being a measure of the percentage of said polymer that is dissolved in an aqueous pH 7.8 buffer solution at 25° C. in 40 minutes.

2. A linear formaldehyde polymer having a standard reactivity of not more than 1, said standard reactivity being a measure of the percentage of said polymer that is dissolved in an aqueous pH 7.8 buffer solution at 25° C. in 40 minutes.

3. A linear formaldehyde polymer which melts at a temperature in the range of 187–190° C., contains 97–99% of formaldehyde, and has a standard reactivity of not more than 2, said standard reactivity being a measure of the percentage of said polymer that is dissolved in an aqueous pH 7.8 buffer solution at 25° C. in 40 minutes.

4. A linear formaldehyde polymer which melts at a temperature in the range of 187–190° C., contains 97–99% of formaldehyde, and has a standard reactivity of not more than 1, said standard reactivity being a measure of the percentage of said polymer that is dissolved in an aqueous pH 7.8 buffer solution at 25° C. in 40 minutes.

5. The process of producing a solid formaldehyde polymer of low reactivity comprising evaporating to substantial dryness an aqueous formaldehyde solution containing at least 35% by weight of formaldehyde under pressure less than atmospheric pressure and in the presence of from 0.03 to 3.5% of sulfur dioxide, based on the weight of formaldehyde, so as to form a first solid formaldehyde polymer having a standard reactivity of more than 2, and thereafter heating said first solid formaldehyde polymer under pressure less than atmospheric pressure to form a second formaldehyde polymer and continuing such heating until said second formaldehyde polymer has a standard reactivity of not more than 2, said standard reactivity being a measure of the percentage of said polymer that is dissolved in an aqueous pH 7.8 buffer solution at 25° C. in 40 minutes.

6. The process of producing a solid formaldehyde polymer of low reactivity comprising evaporating to substantial dryness an aqueous formaldehyde solution containing at least 35% by weight of formaldehyde under a pressure in the range of 25–200 mm. absolute and at a temperature in the range of 40°–80° C. and in the presence of from 0.03 to 3.5% of sulfur dioxide, based on the weight of formaldehyde, so as to form a first solid formaldehyde polymer and thereafter heating said first solid formaldehyde polymer at a temperature in the range of 40°–80° C. and under a pressure in the range of 25–200 mm. absolute to form a second formaldehyde polymer having a standard reactivity of not more than 2, said standard reactivity being a measure of the percentage of said polymer that is dissolved in an aqueous pH 7.8 buffer solution at 25° C. in 40 minutes.

7. The process of producing a solid formaldehyde polymer of low reactivity comprising evaporating to substantial dryness an aqueous formaldehyde solution containing at least 35% by weight of formaldehyde under a pressure in the range of 25–200 mm. absolute and at a temperature in the range of 40°–80° C. and in the presence of 0.1 to 1.0% of sulfur dioxide, based on the weight of formaldehyde, so as to form a first solid formaldehyde polymer and thereafter heating said first solid formaldehyde polymer at a temperature in the range of 40°–80° C. and under a pressure in the range of 25–200 mm. absolute to form a second formaldehyde polymer, said second formaldehyde polymer having a standard reactivity of not more than 2, said standard reactivity being a measure of the percentage of said polymer that is dissolved in an aqueous pH 7.8 buffer solution at 25° C. in 40 minutes.

8. The process of producing a solid formaldehyde polymer of low reactivity comprising evaporating to substantial dryness an aqueous formaldehyde solution containing at least 35% by weight of formaldehyde at a temperature in the range of 55°–65° C. and under a pressure of approximately 100 mm. absolute and in the presence of from 0.1 to 1.0% of sulfur dioxide, based on the weight of formaldehyde, so as to form a first solid formaldehyde polymer and thereafter heating said first solid formaldehyde polymer at a temperature in the range of 55°–65° C. and under a pressure of approximately 100 mm. absolute to form a second formaldehyde polymer, said second formaldehyde polymer having a standard reactivity of not more than 2, said standard reactivity being a measure of the percentage of said polymer that is dissolved in an aqueous pH 7.8 buffer solution at 25° C. in 40 minutes.

9. The process of producing a solid polymer of formaldehyde of low reactivity comprising heating paraformaldehyde in an atmosphere containing at least 50% gaseous sulfur dioxide until the resulting formaldehyde polymer has a standard reactivity of not more than 2, said standard reactivity being a measure of the percentage of said polymer that is dissolved in an aqueous pH 7.8 buffer solution at 25° C. in 40 minutes.

10. The process of producing a solid formaldehyde polymer of low reactivity comprising heating paraformaldehyde with 0.03% to 3.5% of sulfur dioxide, based on the weight of the paraformaldehyde.

References Cited in the file of this patent

UNITED STATES PATENTS 2,125,375     Hinegardner  ---------- Aug. 2, 1938